No. 721,685. PATENTED MAR. 3, 1903.
C. C. EWING.
FLUSH TANK FEEDER AND CLEANER.
APPLICATION FILED JUNE 21, 1902.
NO MODEL.
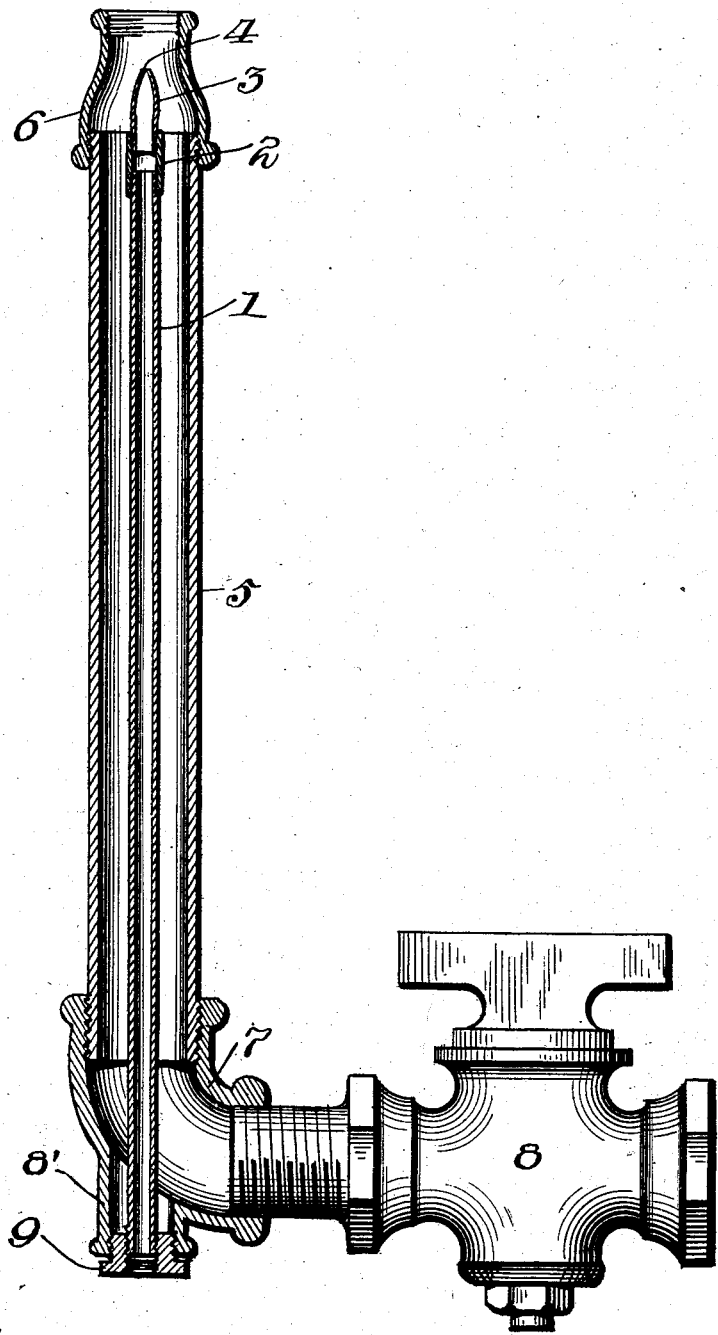
Witnesses:
Inventor,
Charles C. Ewing,
By Attorneys.

UNITED STATES PATENT OFFICE.

CHARLES C. EWING, OF WELLSVILLE, OHIO.

FLUSH-TANK FEEDER AND CLEANER.

SPECIFICATION forming part of Letters Patent No. 721,685, dated March 3, 1903.

Application filed June 21, 1902. Serial No. 112,584. (No model.)

*To all whom it may concern:*

Be it known that I, CHARLES C. EWING, a citizen of the United States of America, residing at Wellsville, in the county of Columbiana and State of Ohio, have invented certain new and useful Improvements in Flush-Tank Feeders and Cleaners, of which the following is a specification, reference being had therein to the accompanying drawing.

This invention relates to certain new and useful improvements in flush-tank feeders and cleaners, and has for its object a device of this character which will prevent the well-known clogging of the pipes with foreign substances when the water is flushed.

To these ends the invention consists in providing the feed-pipe with a peculiarly-constructed nozzle which while not offering obstruction to the passage of the water will still preclude the pipe from clogging should any foreign substances pass therethrough. Further, I propose to encircle this feed-pipe with a chamber wherein the foreign substances may gather should the same not be able to enter the feed-pipe, this chamber having a cock connected thereto whereby any foreign substances which may have gathered may be readily and quickly removed.

With the above and other objects in view the invention consists in the novel construction, combination, and arrangement of parts, to be hereinafter more fully described, and specifically pointed out in the claims.

In describing the invention in detail reference is had to the accompanying drawing, forming a part of this specification, in which the figure represents a central vertical sectional view showing my invention.

The feed-pipe is designated by the reference-numeral 1 and at its upper end is exteriorly threaded to receive the collar 2, this collar being threaded interiorly on both its ends and receives the nozzle 3. This nozzle is of peculiar form, being substantially conical in shape toward its upper portion and having an opening 4 in the apex thereof. This opening may vary in size according to the desired number of flushes, which are periodically operated. By providing this nozzle with openings of varying diameters this may be readily obtained, as will be obvious.

Encircling the feed-pipe 1 is a tube or pipe 5, which at its upper end is exteriorly threaded and receives a coupling 6 to be attached to the tank, which coupling is well known in the art. At its lower end this tube 5 is exteriorly threaded and receives the elbow 7, to the lower end of which is threaded the cock 8. This elbow is further provided with a depending leg 8', interiorly threaded, and receives the threaded plug 9. The feed-pipe 1 is centrally within the tube 5, and a chamber is formed between the two, the feed-pipe being exteriorly threaded at its lower end and received within the plug 9, the latter being interiorly threaded for that purpose.

Of course it will be understood that the lower end of the feed-pipe 1 is connected in the usual manner to a bowl. (Not shown in the drawing.)

Any form of cock may be used, as the same is merely used to draw off or drain any mud or extraneous substances which may have gathered within the chamber previously mentioned. It will further be noted that the plug 9 serves to close the end or bottom wall of the chamber, and the same may be removed for the purpose of cleansing the interior of the chamber, though for all practical purposes I find that the extraneous substances may be readily removed by the use of the cock previously mentioned.

In operation it will be noted that the down-coming water upon striking the nozzle will enter said nozzle through the aperture therein, this aperture being of less diameter than the interior of the feed-pipe in order that if any foreign substances should be of sufficient size to pass through the aperture the same upon entering the feed-pipe will naturally flow freely therethrough by reason of their size. This will permit of an unretarded flow of water through the feed-pipe, and it will further be noted that any substances which might strike the tapering nozzle will be deflected by its sides downwardly and seat within the chamber, where they may be readily removed in the manner previously described.

While I have illustrated the most practical embodiment of my invention, still it will be noted that various changes and alterations may be made in the details of construction and combination of parts without departing from the general spirit of my invention.

Having fully described my invention, what I claim as new, and desire to secure by Letters Patent, is—

1. A device of the type set forth consisting in combination with the feed-pipe, a nozzle at the upper end of said feed-pipe provided with an aperture of less size than said feed-pipe, an elbow carrying said feed-pipe with a tube surrounding the feed-pipe and secured to said elbow and forming a space between the elbow and feed-pipe, and a cock carried by the elbow, substantially as described.

2. A device of the type set forth, consisting of a feed-pipe carrying a nozzle and a tube surrounding the feed-pipe and forming a chamber between itself and the feed-pipe, a connection between the feed-pipe and the tube, and an exhaust communicating with the lower end of said chamber, substantially as described.

3. A device of the type set forth consisting of a feed-pipe carrying a conical nozzle at its upper portion with an aperture in the nozzle of less size than the interior of the said pipe, a tube surrounding the feed-pipe and forming a chamber therebetween, means for securing the feed-pipe and the tube, and an exhaust communicating with said means, substantially as described.

In testimony whereof I affix my signature in the presence of two witnesses.

CHARLES C. EWING.

Witnesses:
WALLACE L. FOGO,
CHARLES R. MCGREGOR.